March 12, 1968  C. G. H. AF SEGERSTAD  3,372,720
MACHINE INTENDED FOR BARKING AND PRUNING
Filed April 27, 1965  5 Sheets-Sheet 1

INVENTOR
Carl Gustaf Härd af Segerstad.
BY
ATTORNEYS

INVENTOR
Carl Gustaf Hård af Segerstad
BY
Mason, Porter, Diller & Brown
ATTORNEYS INVENTOR
Carl Gustaf Hård af Segerstad
BY
Mason, Porter, Diller & Brown
ATTORNEYS

United States Patent Office 3,372,720
Patented Mar. 12, 1968

3,372,720
MACHINE INTENDED FOR BARKING
AND PRUNING
Carl Gustaf Hard af Segerstad, Sandviken, Sweden, assignor to Transventor Aktiebolag, Sandviken, Sweden, a joint-stock company of Sweden
Filed Apr. 27, 1965, Ser. No. 451,140
Claims priority, application Sweden, Apr. 27, 1964, 5,211/64
10 Claims. (Cl. 144—208)

ABSTRACT OF THE DISCLOSURE

This disclosure relates to providing a novel machine for removing the bark from logs and the like, by providing a hollow rotatably driven rotor, with means defining an axial path of travel of a log through the rotor and with spring-biased bark-scraping members. The bark-scraping members are pivotally mounted on the rotor and are generally disposed equidistantly thereabout. The members each have a plurality of striking or cutting portions, mounted for rotation about a common axis and in a common plane. The cutting portions of each member thus have a common plane which is generally parallel to a longitudinal axis of a log being conveyed along its path of travel. The rotating cutting portions of each of the members are adapted for movement whereby their planes of rotation are biased generally toward the longitudinal axis of a workpiece, for tangentially engaging the periphery of a workpiece. The striking portions of each of the members may take on various configurations.

---

The present invention relates to a machine intended for barking and pruning logs or the like of the type comprising a hollow rotor, wherein the hollow rotor is provided with planet wheels adapted to run along a stationary internal gear wheel and to drive rotatable working or machining members turning around a workpiece e.g. a tree, a stem, a log or the like, and wherein the working members are rotatably journalled in swingable portions which through the action of springs or the like tend to thrust on the workpiece.

Machines of this type have a good reputation due to good dependability, simplicity, economy and a great production capability.

The invention has for its object to improve the barking and the pruning capacity by providing a device which makes it possible to obtain a still more efficient production than what has hitherto been possible. This concerns especially the pruning capability.

A special object is to obtain not only an efficient pruning and barking effect but also a thorough disintegration of branches of trees being treated and to utilize all of the tree material.

These objects can be attained by providing working members whose planes of rotation with respect to the rotor are substantially parallel to but exclusive of the longitudinal axis of the workpiece and press against the workpiece generally tangentially to the periphery of the workpiece.

The invention will be further described in the following, reference being made to the drawings.

Figure 1:
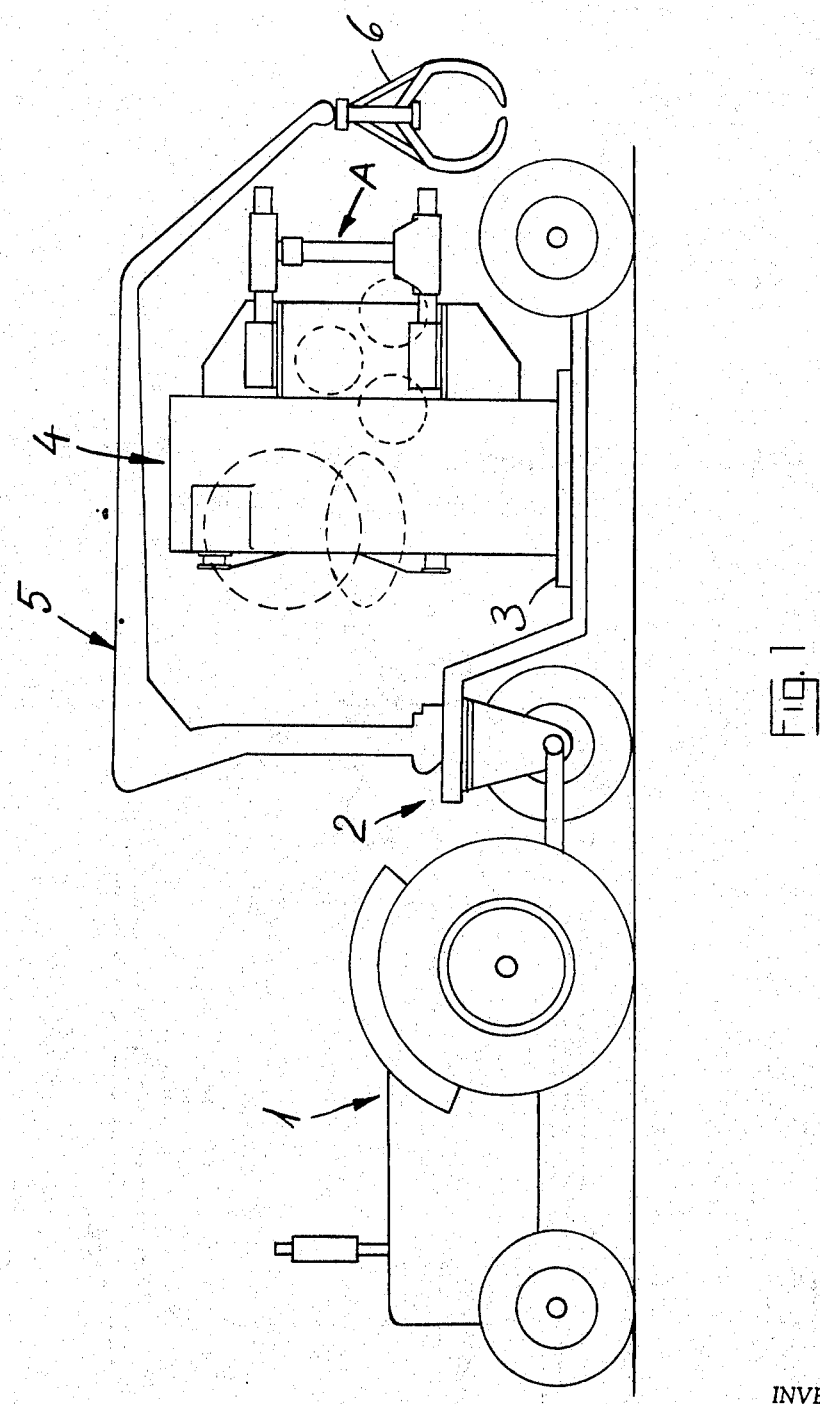
FIGURE 1 shows a tractor or another vehicle pulling a trailer on which a barking and pruning machine according to the present invention is disposed.

In FIGURE 1 the tractor vehicle is designated by 1 and the trailer by 2 carrying on a pivoting support collar 3 or the like the barking and pruning machine 4. 5 designates a loading arm or the like provided with a grasping member 6 e.g. of the hydraulic type. The pivoting support collar allows the machine to be rotated e.g. 90° in relation to the driving direction of the carrying vehicle, which will permit the operator on the network paths to move the trees with their branches from one side of the path, to let them pass through the machine and to come out in a "clean" condition ready for piling on the other side of the path. The position of the machine in relation to the vehicle can be adjusted by support legs or the like which are hydraulically operated.

Through the hollow rotor of the machine, designated by 7, logs or the like are movable centrally and longitudinally by means of hour-glass shaped conveyor rollers 9 and 10 and an upper depressing roller 12 which can be raised and lowered. The rollers 9 and 10 are simultaneously drivable by a motor 11 and a system of chains and sprockets indicated in FIGURE 3.

"A" designates in FIGURE 1 a device for cutting the worked stems or logs in suitable lengths.

The hollow rotor 7 is disposed within a frame 13 of substantially circular shape and with a diameter slightly larger than the largest diameter of the hollow rotor 7. For proper centering of the hollow rotor is provided with a rolling bearing 14.

The bearing means 14 described above for centering the hollow rotor 7 during its rotation serves to assure reliable and vibrationless running avoiding extreme loading on the planet wheels 17, which are fixed to the shafts 18 journalled in the hollow rotor 7 and which are arranged to run along an internal gear wheel 19 immovably fixed to a vertical wall 20 of the frame 13. Thus the planet wheels 17 will always easily and with low friction fulfill their function. To each of the shafts 18, in addition to the planet wheel 17, a bevel gear 21 is fixed, which in its turn is arranged to drive a bevel gear 22 mounted to a shaft 23. To each shaft 23 a sprocket wheel 24 is mounted, which by means of a chain 25 is arranged to drive a second sprocket wheel 26 rigidly mounted to a shaft 27 supporting barking and pruning means or member generally designated by 28, which is according to the invention has a plane of rotation tangential to the periphery of a log or other workpiece and is spring-biased thereagainst, the plane being generally parallel to the longitudinal axis of a path of travel of a workpiece, but the plane of rotation does not contain the longitudinal axis of the workpiece 8.

The purpose of the described transmission of movements and the said thrust with a rotational plane is to obtain that the blows and other aggression by the working members 28 are executed substantially parallel to the longitudinal direction of the trees or logs and thus at approximately right angles to the branches and other formations and to make it possible for the rotating working means 28, in spite of their rotation, to perform yielding movements owing to branches and other uneven portions of the logs or stems which are being debarked and pruned. To obtain these yielding movements of the members 28 at the same time as they are rotating each shaft 27 of the members as well as the shafts 23 of the sprockets 24 and the shafts of the bevel gears are fitted in one and the same portion 29 which is swingable in relation, to the hollow rotor. To assure reliable and constant engagement between the bevel gears 21 and 22 the shaft 18 of the bevel gear 21 is coaxial to the axis of rotation of the portion 29.

In the embodiment illustrated, the portion 29 consists of metal plates welded together and journalled outside a bushing 30 for the shaft 18 and with a bushing 31 on a journal 32, which is fixed to a bracket 33 fixed to the hollow rotor 7. The arrangement is consequently such that, independently of the amplitude of the movements of the portion 29, the bevel gears 21 and 22 will always remain in constant mesh with each other so that constant driving of the rotating working means 28 is ensured.

Figure 3:
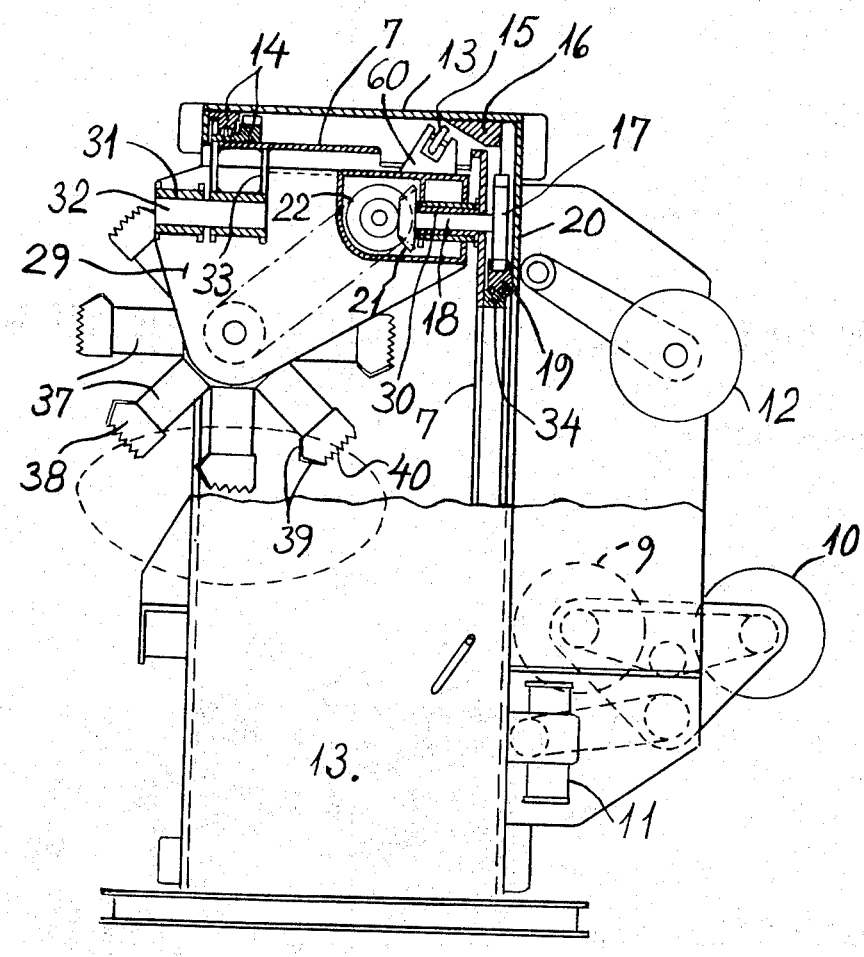
FIGURE 3 shows partially in section on line III—III in FIGURE 2, an elevation of the machine shown in FIGURES 1 and 2.

At 34 the possibility is indicated to mount a bearing ring or collar to the hollow rotor 7 for cooperation with the inner surface of the wheel 19 shaped as a ring gear. Between the wheels or collars 19 and 34 bearing balls are indicated in FIGURE 3. The collar 34 can act as a complement to the other centering means 14, 15 and 16, or the collar 34 can replace one of these means.

Springs 35 are adapted to press the parts 29 towards the object 8 to be machined.

Figure 2:
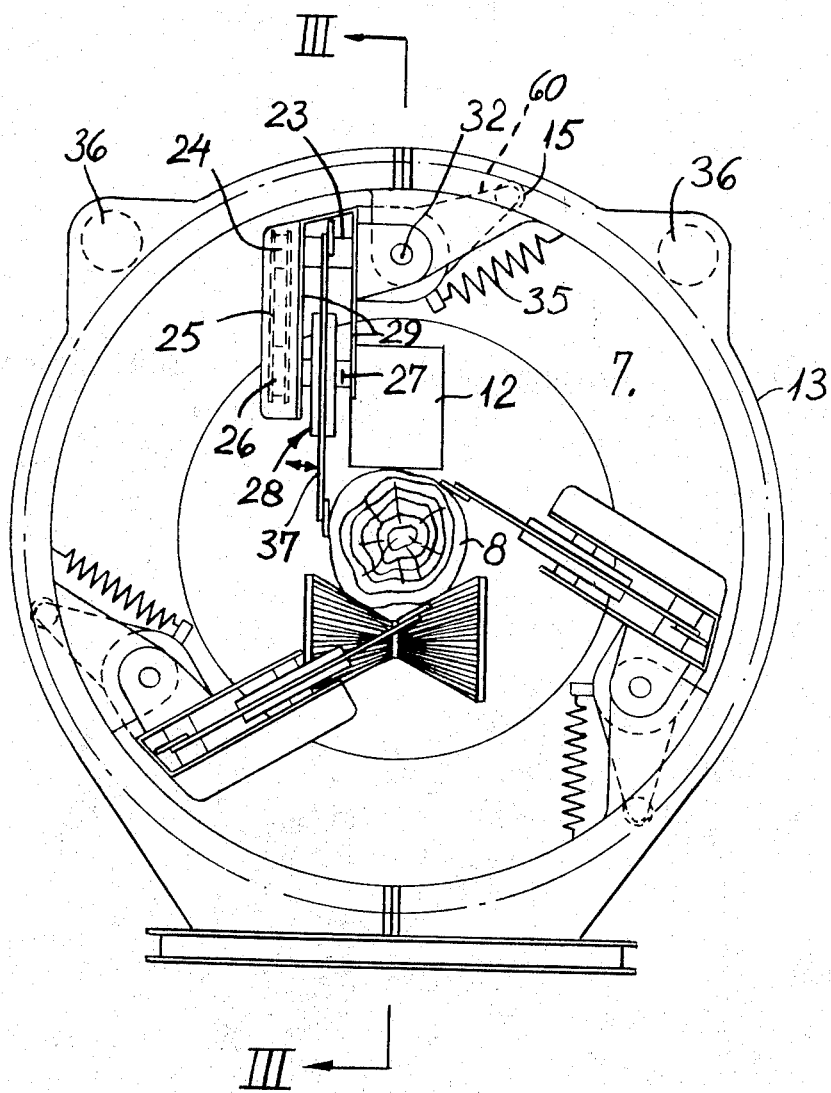
FIGURE 2 shows a partial view of the machine as seen from the left side in FIGURE 1.

For rotating the hollow rotor 7 any suitable arrangement can be used. In FIGURE 2 two gears 36 are indicated which are driven by a motor not shown and are adapted to engage the periphery of the rotor 7 and to rotate the same.

Each working member 28, as illustrated in the drawings, can be provided with several arms 37 which can be adapted for striking as well as cutting action on the object. In the embodiment shown in FIGURE 3 the arms 37 are provided with particular machining tools 38 having edges 39 directed in the direction of rotation and tearing teeth 40 circumferentially distributed.

Figure 5:
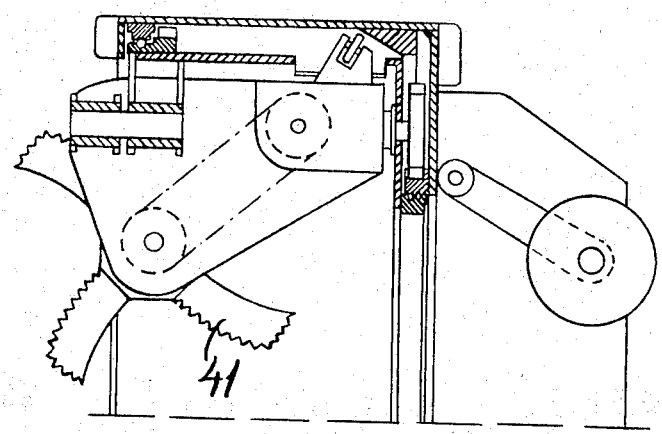
FIGURE 5 is a partial view corresponding to FIGURE 3, of an embodiment with a somewhat modified type of the working or machining member.

In the alternative embodiment shown in FIGURE 5 the working means or member has sabre-shaped curved arms 41, which along their entire length are provided with cutting edges which can be smooth and flat or toothed as indicated in FIGURE 5.

The number of arms of the working means can be chosen at option or with regard to the appearance or nature of the objects to be machined. Thus, FIGURE 3 illustrates an embodiment with eight arms whereas FIGURE 5 indicates four arms only.

Figure 6:
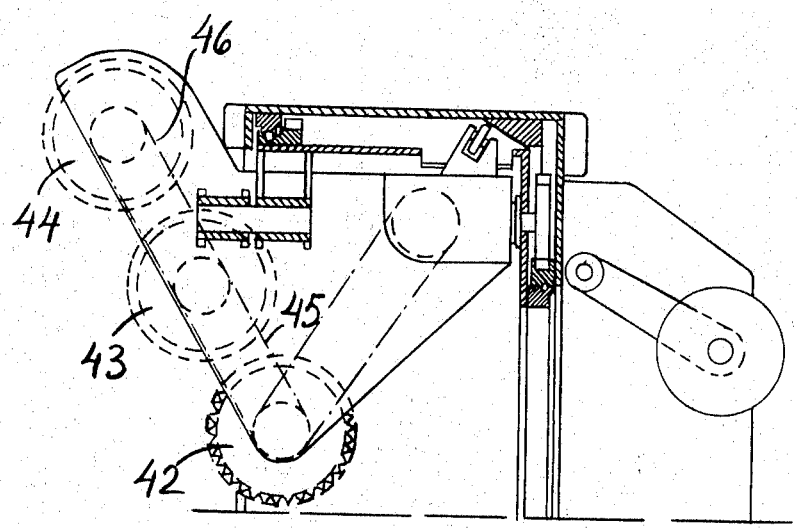
FIGURE 6 is a view similar to FIGURE 5 of another modification with three working members being connected to each other in series.

The modification according to FIGURE 6 presents the possibility of providing two or more rotatable working means in series with each other and in driving relation to each other. In FIGURE 6 the three working means 42, 43 and 44 illustrated are arranged in a straight line to each other and are coupled together in driving relation through chains or the like 45 and 46. Alternatively, the sprocket wheels 42, 43, 44 or the corresponding ones can be adapted in relation to each other more or less deviating from the straight line. The purpose of the series of working means 42, 43, 44 is to attain, at the same time, both machining of the surface itself of a log for barking it and disintegration of the sprigs and branches at a considerable distance from the surface of the stem. In that way an effective disintegration of all the material removed from the stem is attailned, so that the material can be used directly for different suitable purposes such as fuel, as raw material for fibreboard, wallboard, etc. The means 44 at least can preferably be adapted to remove branchery or the like being outside the rotor periphery before it passes into the machine.

Figure 4:
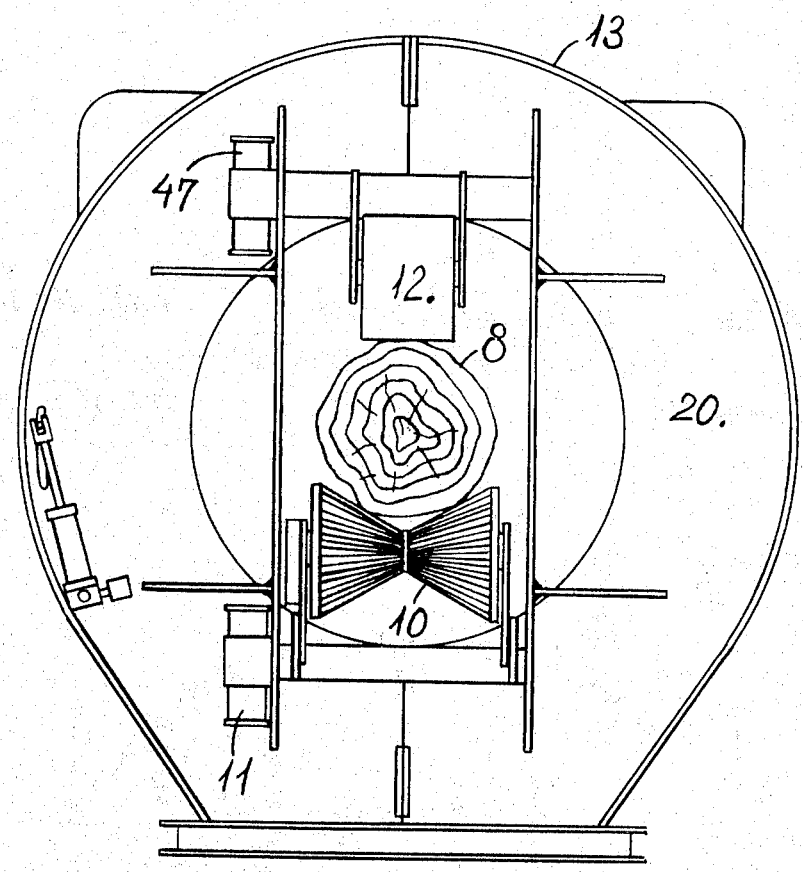
FIGURE 4 shows the same machine as seen from the left side in FIGURE 3.

It is possible to dispose not only the feed rollers 9 and 10 to be drivable but also to drive the upper feed roller 12, which is possible to raise and lower, through a motor designated by 47 in FIGURE 4.

The rollers 15 are cooperating with a correspondingly sloping race 16 which is axially adjustable in order to make the holder 29 swingable outwardly when new logs are to be introduced into the rotor 7. The axial adjustment may be performed by arbitrary means, e.g. any hydraulical apparatus.

It is to be understood that the invention is not confined only to the embodiments as described and illustrated herein, as other embodiments are possible.

Thus, the figures of the drawings indicate the presence of three driving units with one and the same hollow rotor each for driving a rotatable working member. Embodiments are possible where the number of driving units and consequently also the number of working members can be only one or two or more than three.

The arms of the working members can be given the most different appearance and shape, more or less different from what is shown herein. However, in different embodiments it is useful that the arms are yielding or flexible so that when working they can yield for sudden loading and stresses through hard sprigs, branches or the like. The arms can preferably be formed of rubber bands armoured or reinforced with nylon and as a principle have the nature of leaf-shaped elastic spokes. Reference is made to FIGURE 2, where the arms designated by 37 are illustrated as having a very thin appearance.

In FIGURE 2 the rotor is arranged to rotate clockwise, and in FIGURE 3 the working members are also rotating clockwise. However, a different direction of rotation is possible.

What we claim is:

1. A machine of the hollow rotor type intended for barking and pruning having means defining a path for workpiece travel, wherein the hollow rotor is provided with planet wheels adapted to run along a stationary internal gear wheel and to drive rotatable working or machining members turning around the path of travel of a workpiece, and wherein the working members are disposed in at least one plane of rotation generally parallel to the axis of the path of workpiece travel and are rotatably journalled in swingable portions having spring-like means biasing said members toward the path of travel of a workpiece to laterally engage and press against a workpiece, wherein several working or machining members are disposed in series and in a driving relation to each other.

2. A machine of the hollow rotor type intended for barking and pruning having means defining a path for workpiece travel, wherein the hollow rotor is provided with planet wheels adapted to run along a stationary internal gear wheel and to drive rotatable working or machining members turning around the path of travel of a workpiece, and wherein the working members are disposed in at least one plane of rotation generally parallel to the axis of the path of workpiece travel, and are rotatably journalled in swingable portions having spring-like means biasing said members toward the path of travel of a work-piece to laterally engage and press against a workpiece, wherein said members comprise arms provided with workpiece-engaging portions, and wherein the arms are designed to be yielding or flexible at least in the direction substantially across or at right angles to the rotation plane of the member.

3. In a machine for barking and pruning a workpiece, means providing a path of travel for a workpiece, a hollow rotor provided with planet wheels adapted to run along a stationary internal gear wheel and to drive rotatable working means which in operation turn around the path of travel of a workpiece, and wherein said working means are rotatably journalled in swingable portions which through the action of spring means urge said working means toward a path of travel of a workpiece, each of said working means being of generally planar configuration; wherein the plane of rotation of each working means is substantially parallel to but exclusive of the longitudinal axis of the path of travel of a workpiece and generally tangential to the periphery of the path of travel of a workpiece.

4. Apparatus for pruning and barking a workpiece, comprising: a frame, a hollow rotor rotatably mounted on said frame, and adapted to receive said workpiece generally coaxially thereof; drive means for rotating said rotor; a plurality of mounting means carried by said rotor in a circumferentially spaced apart relationship, each of said mounting means including a bracket fixed to said rotor, and a swingable portion pivotally connected to said bracket and projecting inwardly of said rotor; working means rotatably mounted on each of said swingable portions; spring means connected between said rotor and said swingable portions resiliently to urge said working means towards said workpiece; a stationary wheel immovably connected to said frame in axial alignment with said rotor; a planet wheel pivotally mounted to each of said mounting means, in contact with said stationary wheel and connected with the corresponding working means for rotating the same upon rotation of said rotor; means providing a path of travel of a workpiece; rotation of said working means defining a plane of rotation with respect to said rotor, said plane of rotation being substantially parallel to but exclusive of the longitudinal axis of the path of travel of a workpiece and generally tangential to the periphery of the path of travel of a workpiece.

5. Apparatus as claimed in claim 4 wherein said hollow rotor is supported on the frame by bearing means independent of said planet wheels.

6. Apparatus as claimed in claim 4 wherein the working means of each swingable portion comprises a plurality of working members drivingly interconnected to one another.

7. Apparatus as claimed in claim 4 wherein said working means comprises a working member which includes a plurality of radially extending arms having cutting edges.

8. Apparatus as claimed in claim 7 wherein said arms are adapted resiliently to yield in the direction transverse to said plane of rotation.

9. Apparatus as claimed in claim 4 wherein each planet wheel is secured to a driving shaft at one end thereof, the other end of said driving shaft being connected with a driving bevel gear which meshes with a driven bevel gear, said driven bevel gear being fixed at one end of a driven shaft whose other end is adapted to rotate said working means; each driving bevel gear being co-axially aligned with the pivotal connection of the associated mounting means.

10. Apparatus as claimed in claim 6 wherein a working member is adapted to attack branches and sprigs of a workpiece.

References Cited

UNITED STATES PATENTS 2,725,908  12/1955  Ednell et al. _____ 144—208.5
2,897,859  8/1959   Annis _____ 144—208.5 X

FOREIGN PATENTS 908,630  8/1945  France.

WILLIAM W. DYER, Jr., *Primary Examiner.*

W. D. BRAY, *Assistant Examiner.*